April 18, 1939.  J. H. VAN UUM  2,154,711

BEAD TRIM RETAINER CLIP

Filed Dec. 30, 1935

John H. Van Uum INVENTOR.
BY Justin W. Macklin
ATTORNEY.

Patented Apr. 18, 1939

2,154,711

UNITED STATES PATENT OFFICE 2,154,711

BEAD TRIM RETAINER CLIP

John H. Van Uum, Lakewood, Ohio

Application December 30, 1935, Serial No. 56,641

2 Claims. (Cl. 24—213)

This invention relates to devices for securing together a plurality of elements, particularly where one has in it a channel shaped opening provided with inturned flanges and the member to which it is secured is provided with spaced perforations. It is in the nature of a modification and in some respects an improvement of the fasteners shown in my prior application filed October 1, 1935, Serial Number 43,055.

As stated in the application cited, an extensive use of such fasteners is that of securing the channel bead trim now widely used in decoration and finishing of automobile bodies.

The channel molding or trim members vary in sizes particularly in width and height of the bead portion. For example, the trim on any one automobile may be of low, flat type for one, and another kind on the same automobile may be somewhat wider and higher, and it is desirable to have a single type of clip adapted for satisfactory and convenient use with both sizes and shapes of bead trim.

It is therefore one of the objects of this invention to provide a spring clip securing device which shall be simple, effective, and capable of being cheaply manufactured, capable of use with equal facility in either of two or more kinds and sizes of bead trim.

It is a further object of this invention to provide for moving the clips longitudinally in the channel when in position to bring about registration of the clips with the perforations or openings in the frame member to which the bead is to be secured, and through which the clips project when in attached position.

A further object is to so shape the clip that when used with either size or type of channel that it may so engage the interior of the channel as to hold its longitudinal position and may engage the inside wall of the channel bead in such fashion that pressure on the bead may move the clip substantially to its full depth of inserted position in the securing opening.

This feature lends efficiency in application of the bead trim and avoids likelihood of damaging or marring the bead in effecting the insertion of the clips into their respective securing openings.

Other objects will become apparent in the following description which relates to the accompanying drawing, illustrating a preferred embodiment of my new form of spring clip and the essential characteristics of the present clip are summarized in the appended claims.

Figure 1:
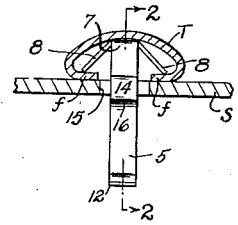
Fig. 1 is a transverse section through a supporting member and channel bead member showing the clip in position.

Trim for various uses such as beading for interior decoration for metal furniture and as heretofore mentioned, for use in the trim of automobiles such as on the radiators, hoods, sides, and rear panels of automobile bodies, have been widely used in the form approximately such as shown in the drawing.

Essentially it comprises a channel having an open side or slot toward the member on which it is to be mounted, the slot being defined by inturned flanges which form the edges of the metal strip from which the bead trim member is formed.

In the drawing, T indicates such a trim strip comprising a convex body or overlying portion having spaced base wall portions or inturned parallel flanges $f$, adapted to fit against supporting members forming a part of the automobile body or hood or part of metal furniture or the like.

Figure 4:
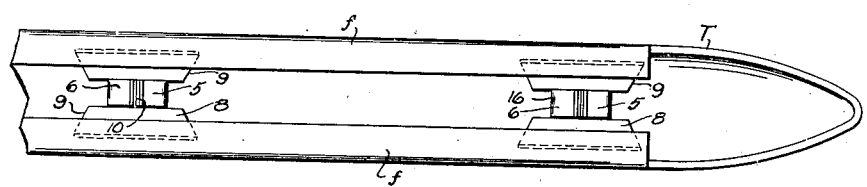
Fig. 4 is a bottom plan view showing the two clips in position in a bead member corresponding to the type shown in Figs. 1 and 2.

The ends of such channel are usually finished somewhat as shown in Fig. 4 at the right, the flanges $f$ terminating short of the rounded end portion leaving an opening through which the head member of a spring clip fastener device may be passed. Obviously however the flanges may be notched or cut away at intervals to permit the insertion of the securing device if desired.

The spring clip of the present invention preferably comprises a single integral piece of metal formed from thin sheet or strip of spring material or at least having resilient quality. From such a blank of material strip portions 5 and 6 are cut along lines forming the edges of these flat leg members stopping short of meeting at a central or intermediate zone portion 7 and integrally with side wing or head members 8, the ends of which are preferably sloped as shown at 9, the leg members are then bent to the form shown bringing the ends together at the lower portions as 12, while the members 8 are bent downwardly to a predetermined angle in order to fit inside of the channel, as shown in Fig. 1.

Figure 2:
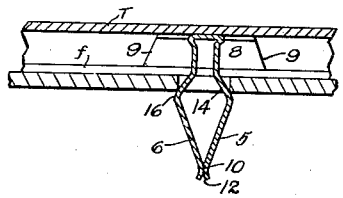
Fig. 2 is a section showing the same parts taken longitudinally of the channel.

In order to cause effective engagement of the leg portions 5 and 6 with a securing opening as at 15, they are shaped to provide the parallel sloping locking shoulders 14 above which the legs may be substantially parallel as shown in Fig. 2. The lower portions of the legs meeting at 10 normally position the outwardly projecting shoulders 16 in the nature of knees of the legs to engage beneath the edge of the opening 15 and by exerting an outward pressure effect close engagement with the lower or inner edge of the opening of the supporting member.

For the use illustrated in Figs. 1, 2, and 4, the head members 8 are inserted into the bead trim at one end, for example, at the right in Fig. 4, and are moved to the approximate position for registration with the openings in the supporting member.

It will be noted that the bottom edges of the wing or head members 8 engage the inside of the base wall or inturned flanges f, while the top 7 fits against the inside top surface of the overfits lying wall portion or trim T. Thus as the trim is pressed firmly against the support, the legs are passed through the opening, the knees or shoulders 16 being pressed together and then spring outwardly beneath the opening, effecting the engagement desired.

Figure 3:
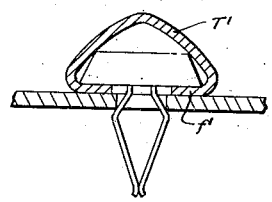
Fig. 3 is a section similar to Fig. 1 showing the larger and higher form of bead trim secured by the same clip.
Figure 5:
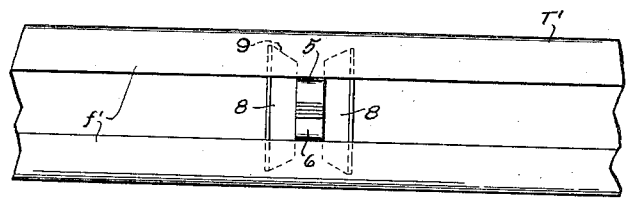
Fig. 5 is a bottom plan view of the same clip in position in the bead shown in Fig. 3.
Figure 6:
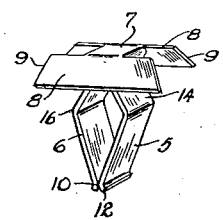
Fig. 6 is a perspective view of the securing clip.

The sloping ends 9 of the wing or head members 8 provide for fitting into the channel trim member T1, Figs. 3 and 5. In this case the wing members extend transversely of the channel and their lower edges engage the flanges f1 as before except transversely thereof, while the legs 5 and 6 project outwardly from the channel as shown. The upper edges of the ends of the wings engage the sloping inner surface of the bead as shown in Fig. 4, but not too tightly to prevent sliding the clip longitudinally thereof. This engagement however provides for forcing the shoulders or knees 16 of the legs of the clip through the securing opening as before.

In each instance the engagement of the lower ends of the legs 5 as at 10 provides for a bridge action of each leg between its upper anchor and the lower ends, thus effecting a stiffness of spring action greater than were the lower ends of the legs to be free.

The result of this is that a much lighter gauge of metal may be used for forming the clip while securing the desired degree of effective engagement. Correspondingly, the clip may be more cheaply manufactured than if the spring legs were allowed to be free and secured either below or above the opening at the one side thereof only.

It will be seen from the foregoing that I have provided a clip which may be stamped from a flat sheet of material and may be conveniently bent by suitable tools to the finished form shown with high production tools and with corresponding great cheapness of manufacture.

It will be further seen that its assembly and utility afford a maximum efficiency in applying the clips to the trim and the trim to the part to which it is to be affixed.

It is to be understood that modifications and alterations may be made in the shape and form of my securing device without departing from the spirit of the present invention and all within the scope of the following claims.

Having thus described my invention, what I claim is:

1. A spring fastener for securing a hollow member having inturned base flanges to an apertured support, said fastener being made in one piece from flat spring sheet stock and with a shank comprising downwardly extending legs with relatively broad faces adjacent each other and which are spaced apart intermediately of their ends in a common vertical plane, and converge both upwardly and downwardly from said spaced region of the legs to enable spring engagement with such opening in the supporting member in a known or suitable manner; the fastener being characterized particularly in that oppositely and downwardly inclined wing members are contiguous with the legs at their upper ends and directed away from the legs on opposite sides of said plane and form head portions of the fastener which are yieldable toward and away from such plane for yieldingly pressing the inturned flanges of such hollow member toward the support by substantial flexure of the wing members without tending to affect the relative position of the legs.

2. A fastener according to claim 1 wherein the legs are integrally joined at the top by a short horizontal portion of the stock and have free lower ends which are normally in abutment, and the wings extend from said horizontal portion and are enlarged relative to the legs in opposite directions from the horizontal portion for greater amplitude of engagement with the hollow member to be secured by the fastener.

JOHN H. VAN UUM.